UNITED STATES PATENT OFFICE.

FRANZ WELZ, OF KLOSTERGRAB, AUSTRIA-HUNGARY.

MANUFACTURE OF ROSE OR ORANGE STAINED GLASS.

SPECIFICATION forming part of Letters Patent No. 479,689, dated July 26, 1892.

Application filed January 11, 1892. Serial No. 417,676. (No specimens.)

*To all whom it may concern:*

Be it known that I, FRANZ WELZ, manufacturer, a subject of the Emperor of Austria-Hungary, residing at Klostergrab, in the Province of Bohemia, in the Empire of Austria-Hungary, have invented certain new and useful Improvements in the Manufacture of Rose or Orange Stained Glass; and I do hereby declare the following to be a full, clear, and exact description of the invention, such as will enable others skilled in the art to which it appertains to make and use the same.

My invention has relation to the manufacture of colored glass; and has for its object the provision of means whereby a permanent color may be imparted to the glass without reheating or staining by dipping the finished article into glass containing gold salts.

The invention relates more particularly to the manufacture of colored glass the tint of which varies from a rose to an orange or orange-red color; and it consists, essentially, in the admixture with the molten glass of selenium or of selenium and cadmium sulphide. If selenium alone is added and incorporated with the molten glass, the latter assumes a rose color, the depth of which can be varied by varying the proportion of selenium. On the other hand, the proportion of selenium for a given depth of color will depend upon the composition of the vitreous mass, which composition differs for the various grades of glass.

To distinguish the rose-colored product, I have called it "créme-rose" or "rose-cream."

If cadmium sulphide is combined with the selenium and the mixture added to the molten vitreous mass, the latter will assume a red-orange color, the shades of which, ranging from orange-red to orange-yellow, will depend upon the proportion of cadmium sulphide used with the selenium, the color changing from orange-red to orange-yellow as the proportion of cadmium sulphide is increased relatively to the selenium used. In order to distinguish this product, I have called it "créme-orange" or "orange-cream." It is obvious that the proportions of these substances to be incorporated with the molten vitreous mass cannot well be given, for the reason that these will greatly vary, according to the depth of color to be given to the final product.

The molten vitreous mass, colored as described, can be worked at once into any desired article, and does not require either reheating or staining, the color being also permanent.

Having thus described my invention, what I claim as new therein, and desire to secure by Letters Patent, is—

1. In the manufacture of colored glass, the herein-described process, which consists in mixing selenium with molten glass, as set forth.

2. In the manufacture of colored glass, the herein-described process, which consists in mixing selenium and cadmium sulphide with molten glass, as set forth.

In testimony whereof I affix my signature in presence of two witnesses.

FRANZ WELZ.

Witnesses:
 ADOLPHE FISCHER,
 ANTON T. KILTZ.